(12) United States Patent
Tweitmann et al.

(10) Patent No.: US 11,045,859 B2
(45) Date of Patent: Jun. 29, 2021

(54) TOOL CARTRIDGE

(71) Applicant: TRUMPF Schweiz AG, Gruesch (CH)

(72) Inventors: Mathias Tweitmann, Waedenswil (CH); Etienne Lardon, Huenenberg See (CH)

(73) Assignee: TRUMPF Schweiz AG, Gruesch (CH)

( * ) Notice: Subject to any disclaimer, the term of this patent is extended or adjusted under 35 U.S.C. 154(b) by 44 days.

(21) Appl. No.: 16/524,561

(22) Filed: Jul. 29, 2019

(65) Prior Publication Data

US 2019/0344323 A1 Nov. 14, 2019

Related U.S. Application Data

(63) Continuation of application No. PCT/EP2018/052639, filed on Feb. 2, 2018.

(30) Foreign Application Priority Data

Feb. 3, 2017 (DE) .......................... 102017201788.0

(51) Int. Cl.
*B21D 37/04* (2006.01)
*B23Q 3/155* (2006.01)

(52) U.S. Cl.
CPC ......... *B21D 37/04* (2013.01); *B23Q 3/15553* (2013.01)

(58) Field of Classification Search
CPC ........ B21D 37/04; B21D 37/14; B21D 28/02; B21D 28/26; B21D 45/003; B21D 45/006; B21D 45/06; B21D 28/34; B23Q 3/15553; Y10T 483/1729; Y10T 483/1809; Y10T 28/49826; Y10T 83/8748; Y10T 83/9476

(Continued)

(56) References Cited

U.S. PATENT DOCUMENTS 3,294,131 A * 12/1966 Larson ................. A01G 23/089
144/34.5
3,625,268 A * 12/1971 Kempe ................. A01G 23/089
144/34.5

(Continued)

FOREIGN PATENT DOCUMENTS

DE 3730446 11/1993
DE 4494432 4/2004

(Continued)

OTHER PUBLICATIONS

CN Office Action in Chinese Appln. No. 201880010165, dated Jul. 31, 2020, 15 pages (with English translation).

(Continued)

*Primary Examiner* — Ghassem Alie
(74) *Attorney, Agent, or Firm* — Fish & Richardson P.C.

(57) ABSTRACT

A tool cartridge for accommodating tool parts of a multi-part processing tool having a stamp and a die for processing of plate-shaped workpieces is provided. The tool cartridge includes a cartridge base body, a stamp holder for detachably holding a tool part configured as a processing stamp and a die holder for detachably holding a tool part configured as a processing die. The stamp holder includes two cartridge arms pivotable to one another which respectively include a pin for supporting the respective cartridge arm in a pivotable manner. The cartridge base body includes two orifices related to the pins for accommodating the pins in a rotatable manner.

17 Claims, 2 Drawing Sheets

(58) Field of Classification Search
USPC ............ 83/583, 563, 564, 689.19, 698, 701;
29/559, 428, 568; 483/28, 29; 72/444,
72/446, 448
See application file for complete search history.

(56) References Cited

U.S. PATENT DOCUMENTS

| | | | | |
|---|---|---|---|---|
| 3,811,179 | A * | 5/1974 | Anderson | B23Q 3/15766 483/46 |
| 4,084,300 | A * | 4/1978 | Narushima | B23Q 3/15526 483/1 |
| 4,419,807 | A * | 12/1983 | Moulin | B23Q 3/1554 483/59 |
| 4,423,546 | A * | 1/1984 | Scott | B21D 28/12 483/29 |
| 4,485,549 | A | 12/1984 | Brolund | |
| 4,616,397 | A * | 10/1986 | Yasukawa | B23Q 3/15526 483/54 |
| 4,843,704 | A | 7/1989 | Sakamoto et al. | |
| 4,951,375 | A * | 8/1990 | Erlenmaier | B21D 37/145 483/14 |
| 5,674,170 | A * | 10/1997 | Girardin | B23Q 3/15526 483/59 |
| 5,913,761 | A | 6/1999 | Kamada et al. | |
| 6,077,206 | A * | 6/2000 | Azema | B23Q 3/15706 483/3 |
| 7,159,712 | B1 | 1/2007 | Chen | |
| 7,913,533 | B2 | 3/2011 | Lee et al. | |
| 2007/0191199 | A1 | 8/2007 | Palick et al. | |
| 2012/0309600 | A1 | 12/2012 | Schindewolf et al. | |
| 2012/0312067 | A1 * | 12/2012 | Broadbent | B21D 28/34 72/462 |

FOREIGN PATENT DOCUMENTS

| | | |
|---|---|---|
| DE | 102017201788 | 8/2018 |
| EP | 2529854 | 12/2012 |
| WO | WO 2018/141901 | 8/2018 |

OTHER PUBLICATIONS

PCT International Preliminary Report on Patentability Appln. No. PCT/EP2018/052639, dated Aug. 6, 2019, 16 pages (with English translation).

PCT International Search Report and Written Opinion in International Appln. No. PCT/EP2018/052639, dated May 23, 2018, 18 pages (with English translation).

* cited by examiner

TOOL CARTRIDGE

CROSS REFERENCE TO RELATED APPLICATIONS

This application is a continuation of and claims priority under 35 U.S.C. § 120 from PCT Application No. PCT/EP2018/052639 filed on Feb. 2, 2018, which claims priority from German Application No. DE 10 2017 201 788.0, filed on Feb. 3, 2017. The entire contents of each of these priority applications are incorporated herein by reference.

TECHNICAL FIELD

The invention generally relates to a tool cartridge, in particular to a tool cartridge for accommodating tool parts of a multi-part processing tool for processing plate-shaped workpieces.

BACKGROUND

Tool cartridges with cartridge arms, for example, forming a stamp holder for detachably holding a tool part configured as a processing stamp, are known. In order to perform a pivoting motion, the cartridge arms respectively comprise an orifice forming a bearing together with a pin about which the respective cartridge arm swivels, the pin being inserted in the tool cartridge. In particular in the case of heavy processing tools (heavy processing stamps), the problem that the cartridge arms and, therefore, the processing stamp hangs downwardly due to a clearance fit in the bearing arises which can lead to problems in a stamp sensor system of a processing machine in which the processing tool is used.

Further, the problem that fretting rust occurs in the orifice between the cartridge arm and the pin arises. This happens in particular when the cartridge is cleansed by watery cleansing baths in ultrasonic baths.

SUMMARY

One object of the invention is to solve the above problems, i.e., to provide a tool cartridge preventing downwardly hanging of the cartridge arms in case of heavy processing stamps and preventing the occurrence of fretting rust in the orifice between the cartridge arm and the pin.

According to an aspect of the invention, a tool cartridge in which cartridge arms respectively comprise a pin for supporting the cartridge arm in a pivotable manner is provided, wherein a cartridge base body respectively comprises a related orifice for accommodating the pin in a rotatable manner.

Due to the accommodation of the pin in a pivotable manner, the cartridge arm can be provided with the pin. By a tight connection between the cartridge arm and the pin, the problem that the cartridge arm, in particular, by a load heavy due to processing tools, hangs downwardly is eliminated.

In the prior art, the downwardly hanging occurs due to a small guide length of a clearance fit of a bearing between the cartridge arm and the pin. The small guide length is caused by a small thickness of the cartridge arm. However, this clearance fit is necessary at this place when the cartridge arm swivels around the pin.

According to the invention, an elastic deformation of the material is greatly reduced and an increase of a clearance between the cartridge arm and the pin due to wear of the bearing between the cartridge arm and the pin which leads to a downwardly hanging of the cartridge arm is prevented.

This is enabled by an elimination of the bearing having the small support length between the cartridge arm and the pin. Since, due to the tight connection, large radial forces emerging due to a moment of load of the processing stamp are distributed over the entire length of the connection between the pin and the cartridge arm instead of punctually arising at axial ends of the bearing, the elastic deformation as well as the wear due to these forces in connection with a relative motion between the cartridge arm and the pin are reduced or prevented. Further, the emergence of the fretting rust at this place is also prevented.

By a preferable configuration as a press fit, the tight connection can be easily and economically achieved.

When the pins preferably comprise a length being at least a quadruple (or four times) of a thickness of the cartridge arm at the tight connection, a radial support force of the pins in the orifices is small due to a large support length so that no or only minimum wear occurs.

In particular, in a case in which the pins protrude toward one side of the cartridge arm, a protruding length is preferably a triple (or three times) of the thickness of the cartridge arm at the tight connection so that the small radial support force is ensured.

Preferably, the tool cartridge is provided with several spaced portions having aligned orifices for the pins. Upon an accordingly adjusted length and position of the pins, despite saving of material of the tool cartridge which enables a reduction in weight and a reduction of costs, a large support length can be achieved.

Upon a preferable protruding of the pin on both sides of the cartridge arm, a support length of the pin outside the cartridge arm is enlarged which leads to reduced radial support forces.

By a advantageous provision of the orifices on both sides of the cartridge arm and of at least one of the orifices on another side of the cartridge base body in a further component joined to the cartridge base body, dropping out of the cartridge arm having the pin can be prevented, assembly is facilitated, and the pin can be radially support in the further component which, in turn, brings advantages in the stiffness of the bearing of the cartridge arms.

Upon an advantageous provision of at least portions in the cartridge base body made of plastic and forming the pins from steel, on the one hand, an advantageous slip pairing is enabled and, on the other hand, fretting rust is prevented which, e.g., enables cleansing of the tool cartridges in ultrasonic baths with watery cleansing detergents.

When the cartridge base body of the tool cartridge is preferably made of plastic, the cartridge base body can be manufactured with reduced weight in a cost effective manner. Further, even a specific shape of the base body can easily be manufactured in a huge quantity.

Upon an advantageous implementation of the pins and the related orifices such that they form a transition fit with low backlash, the downwardly hanging of the processing stamps can be reduced.

DESCRIPTION OF DRAWINGS

The invention is now elucidated by means of an embodiment referring to the attached drawings.

In particular.

DETAILED DESCRIPTION

Figure 1:
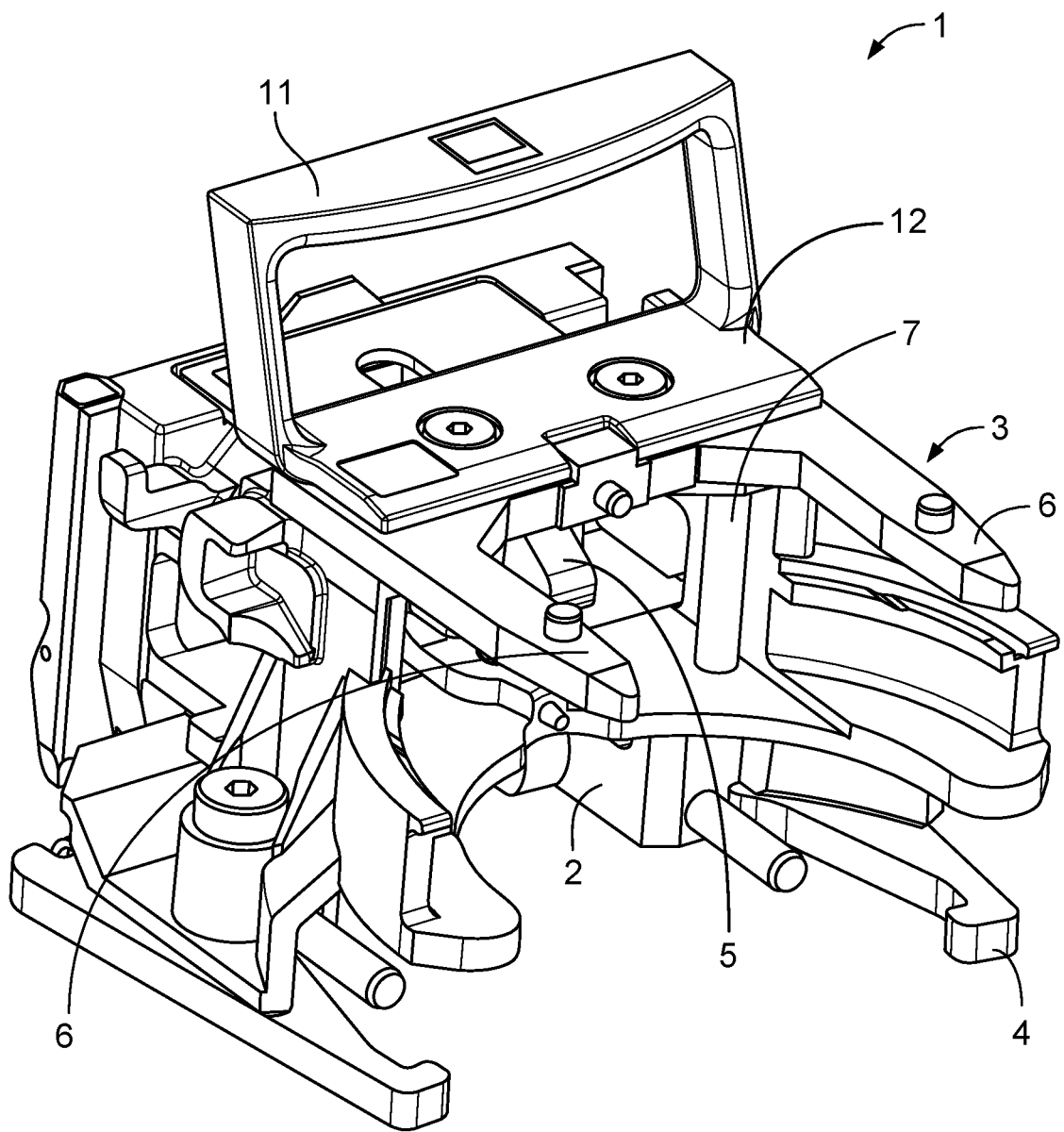
FIG. 1 shows a perspective view of a tool cartridge according to the invention.
Figure 2:
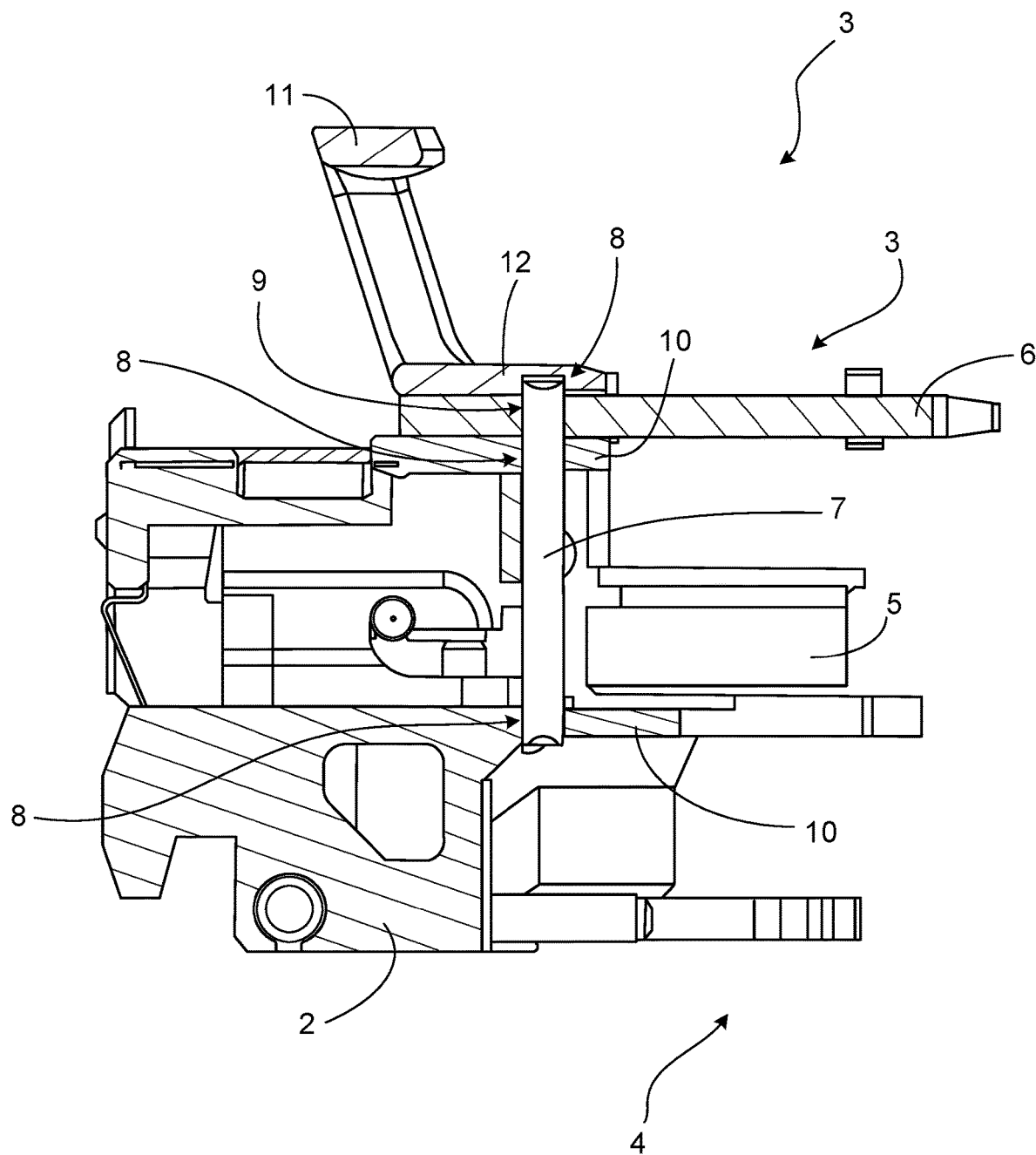
FIG. 2 shows a lateral sectional illustration of the tool cartridge.

FIG. 1 shows a perspective view and FIG. 2 shows a lateral sectional illustration of a tool cartridge 1 according to the invention.

The tool cartridge 1 serves for accommodating a multi-part processing tool (not shown) for processing plate-shaped workpieces. The tool cartridge 1 comprises a cartridge base body 2. On the cartridge base body 2, a stamp holder 3 for detachably holding a tool part of the processing tool configured as a processing stamp and a die holder 4 for detachably holding a tool part of the processing tool configured as a processing die are provided. Further, a holder 5 for a stripper of the processing tool which is preferably suitable for processing plate-shaped workpieces is provided. Alternatively, embodiments in which this holder 5 is not provided are also possible since there are processing tools which do not have any stripper.

The stamp holder 3 comprises two cartridge arms 6. The cartridge arms 6 are pivotable to one another and are respectively pre-stressed by a spring (not shown). Therefore, in a rest position in which no processing stamp is accommodated, they have a distance smaller than a dimension of a pick-up element of the processing stamp so that the processing stamp is clamped when being inserted into the stamp holder. The cartridge arms 6 respectively comprise a pin 7 for supporting the cartridge arms 6 in a pivotable manner. Thereto, the pins 7 are rotatably accommodated in related orifices 8 (FIG. 2) generated in the cartridge base body 2. The pins are optionally arranged in parallel so that the cartridge arms 6 can swivel in a plane.

The pins 7 are preferably configured as separate components and the cartridge arms 6 comprise recesses which are accordingly formed so that the pins 7 in the recesses 9 (FIG. 2) are tightly connected with the cartridge arms 6. In this embodiment, the tight connection is configured as a press fit; however, it can alternatively be configured by welding, soldering, bonding or the like.

A length of the pins 7 is here chosen such that it is about one octuple (or eight times) of a thickness of the cartridge arm 6 in the axis direction of the pins 7 at the tight connection. Alternatively, a length of the pins being at least a quadruple (or four times) of this thickness of the cartridge arm 6 is already advantageous.

The connection of the pins 7 and the cartridge arms 6 is chosen such that the pins 7 protrude in their axial direction on both sides of the cartridge arms 6. In an alternative embodiment, the pins 7 can also protrude only on one side or one of the pins 7 protrude on one side and another one of the pins 7 protrude on both sides. In this embodiment, the pins 7 protrude about a septuple (or seven times) of the thickness of the cartridge arm 6 in the axis direction of the pins 7 at the tight connection. Alternatively, a protruding length of the pins having at least a triple (or three times) of this thickness of the cartridge arm 6 is already advantageous.

The tool cartridge 1 comprises several portions 10 (FIG. 2) spaced from one another in which the respective orifices 8 for rotatably accommodating the pins 7 are generated. The portions 10 are here provided on the cartridge base body 2, however, they can also be provided by other components of the tool cartridge 1. The orifices 8 in the portions 10 are arranged in an aligned manner for accommodating a respective one of the pins 7 so that the pins 7 can be accommodated in the aligned orifices 8. The length of the pins 7 is dimensioned and the respective position of the orifices 8 is arranged such that the respective pins 7 are accommodated in the respective aligned orifices 8. In an alternative embodiment, several aligned orifices 8 for accommodating the pins 7 are not provided but respectively only one orifice 8 for one of the pins 7 is provided, wherein this orifice has to have an accordingly sufficient length and a position in order to support the cartridge arm 6 without any occurrence of a downwardly hanging.

The tool cartridge 1 further comprises a yoke 11 provided with a mounting portion 12. The yoke 11 is connected to the cartridge base body 2 by means of the mounting portion 12. The yoke 11 comprises at least one further one of the orifices 9 in which the pin 7 is rotatably accommodated. In this embodiment, at least one of the orifices 9 is generated on the one side of the cartridge arm 6 in the cartridge base body 2 and at least another one of the orifices 9 is generated in the mounting portion 12 of the yoke 11, i.e., in a component joined to the tool cartridge 1, on the other one of the two sides of the cartridge arm 6.

The cartridge base body 2 is made of plastic, in particular, of fiber-reinforced polyamide. In an alternative embodiment, merely portions of the cartridge base body 2 in which the orifices 8 are generated are made of plastic. The pins 7 are made of steel. Alternatively, the cartridge base body can be made of another material, e.g., aluminum or a magnesium alloy.

In order to ensure a good movability but to prevent a downwardly hanging of the processing stamp at the cartridge arms 6, the pins 7 and the related orifices 8 are adapted to configure a low-backlash transition fit. Therefore, diameters of the pins 7 and of the orifices 8 having a common nominal dimension are in a tolerance range in which no jamming but also no excessive clearance therebetween occur.

All features depicted in the description, the subsequent claims and the drawings may be, solitary as well as in an arbitrary combination, essential for the invention.

What is claimed is:

1. A tool cartridge for accommodating tool parts of a multi-part processing tool for processing plate-shaped workpieces, the tool cartridge comprising:
    a cartridge base body;
    a stamp holder configured to detachably hold a first tool part of the processing tool configured as a processing stamp; and
    a die holder configured to detachably hold a second tool part of the processing tool configured as a processing die,
    wherein the stamp holder comprises two cartridge arms pivotable with respect to one another and supported on respective pins, and
    wherein the cartridge base body defines orifices rotatably accommodating the pins, wherein the pins are configured as separate components, wherein the cartridge arms define corresponding holes in which the pins are in tight connection with the cartridge arms, and wherein the tight connection between the pins and the cartridge arms is configured as press fit.

2. The tool cartridge of claim 1, wherein, in an axis direction of at least one of the pins, the pin has a length being at least four times of a thickness of the cartridge arm adjacent to the pin in the axis direction.

3. The tool cartridge of claim 2, wherein the pin is configured to protrude in the axis direction at least three times the thickness of the cartridge arm on at least one side of the cartridge arm.

4. The tool cartridge of claim 1, wherein a first pin of the pins is configured to be in the tight connection with a first cartridge arm of the cartridge arms, and a second pin of the pins is configured to be in the tight connection with a second cartridge arm of the cartridge arms, and wherein, at the tight connection, the first pin is configured to protrude in an axis direction of the first pin on one side of the first cartridge arm, and the second pin is configured to protrude in an axis direction of the second pin on both sides of the second cartridge arm.

5. The tool cartridge of claim 1, wherein the tool cartridge comprises multiple portions spaced from one another, and wherein the portions have respective orifices arranged in alignment at respective positions.

6. The tool cartridge of claim 5, wherein a length of the pins is dimensioned and the respective positions of the respective orifices are arranged such that the pins are accommodated in the respective orifices.

7. The tool cartridge of claim 1, wherein the pins are arranged in the cartridge arms such that each of the pins protrudes in an axis direction of the pin on both sides of the cartridge arm associated with the pin.

8. The tool cartridge of claim 7, further comprising a mounting portion joined to the cartridge base body, and wherein at least one of the orifices for the pin is generated in the cartridge base body on one of the sides of the cartridge arm and at least one other of the orifices for the pin is generated in the mounting portion on the other one of the sides of the cartridge arm.

9. The tool cartridge of claim 8, wherein the pin is configured to be radially supported in the mounting portion.

10. The tool cartridge of claim 1, wherein the pins are made of steel, and the cartridge base body comprises at least portions made of plastic in which the orifices are generated.

11. The tool cartridge of claim 10, wherein the cartridge base body is made of plastic.

12. The tool cartridge of claim 1, wherein at least one of the pins and at least one of the orifices associated with the at least one of the pins are adapted to configure a low-backlash transition fit.

13. The tool cartridge of claim 1, further comprising:
a yoke having a mounting portion,
wherein the yoke is configured to be connected to the cartridge base body by the mounting portion.

14. The tool cartridge of claim 13, wherein the yoke comprises at least one orifice in which one of the pins is rotatably accommodated.

15. The tool cartridge of claim 14, wherein the one of the pins is accommodated
in the at least one orifice of the yoke on one of sides of the cartridge arm associated with the one of the pins and
in at least one of the orifices in the cartridge base body on the other one of the sides of the cartridge arm.

16. The tool cartridge of claim 1, further comprising:
a stripper holder configured to hold a stripper of the processing tool that is configured to process the plate-shaped workpieces.

17. A tool cartridge for accommodating tool parts of a multi-part processing tool for processing plate-shaped workpieces, the tool cartridge comprising:
a cartridge base body;
a stamp holder configured to detachably hold a first tool part of the processing tool configured as a processing stamp; and
a die holder configured to detachably hold a second tool part of the processing tool configured as a processing die,
wherein the stamp holder comprises two cartridge arms pivotable with respect to one another and supported on respective pins,
wherein the cartridge base body defines orifices rotatably accommodating the pins,
wherein the tool cartridge comprises multiple portions spaced from one another, and the portions have respective orifices arranged in alignment at respective positions, and
wherein a length of the pins is dimensioned and the respective positions of the respective orifices are arranged such that the pins are accommodated in the respective orifices.

* * * * *